(12) United States Patent
Shiao et al.

(10) Patent No.: US 7,195,417 B2
(45) Date of Patent: Mar. 27, 2007

(54) COMPOSITE TIE ROD

(75) Inventors: Sam Shiao, Cerritos, CA (US); Robert P. Chen, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 222 days.

(21) Appl. No.: 10/897,137

(22) Filed: Jul. 21, 2004

(65) Prior Publication Data

US 2006/0019759 A1 Jan. 26, 2006

(51) Int. Cl.
*F01D 1/26* (2006.01)
(52) U.S. Cl. .............................. 403/408.1; 416/198 A
(58) Field of Classification Search ............ 52/223.13, 52/309.2, 740.1; 464/181, 903; 249/213; 60/226.1; 403/291, 368, 369, 408.1; 411/14.5; 14/22; 419/198 R–198 A
See application file for complete search history.

(56) References Cited

U.S. PATENT DOCUMENTS

| | | | | |
|---|---|---|---|---|
| 1,909,332 | A | * 5/1933 | Blackburn | .............. 403/291 X |
| 2,452,782 | A | * 11/1948 | McLeod et al. | ......... 416/201 R |
| 4,089,190 | A | 5/1978 | Worgan et al. | |
| 4,388,014 | A | * 6/1983 | Wlodkowski et al. | ...... 403/369 |
| 4,633,540 | A | * 1/1987 | Jungwirth et al. | ............. 14/22 |
| 4,838,833 | A | 6/1989 | Coursin | |
| 5,720,139 | A | * 2/1998 | Sorkin | ..................... 52/223.13 |
| 6,234,912 | B1 | 5/2001 | Koschier et al. | |
| 6,398,658 | B1 | 6/2002 | Gozdawa | |
| 6,409,606 | B1 | 6/2002 | Nakajima et al. | |
| 6,464,591 | B1 | 10/2002 | Nakajima | |
| 6,523,207 | B1 | * 2/2003 | Stubler et al. | ................. 14/22 |
| 6,718,707 | B2 | * 4/2004 | Marshall | .................. 52/223.13 |

\* cited by examiner

*Primary Examiner*—Greg Binda
(74) *Attorney, Agent, or Firm*—Oral Cagler, Esq.

(57) ABSTRACT

A composite tie rod comprises a plurality of coated fiber bundles stretched between two nut assemblies. Fiber holders, in combination with the nut assemblies, hold the fiber bundles in tension to provide a compressive force for maintaining component placements along the entire axial length of a turbomachinery rotor.

20 Claims, 9 Drawing Sheets

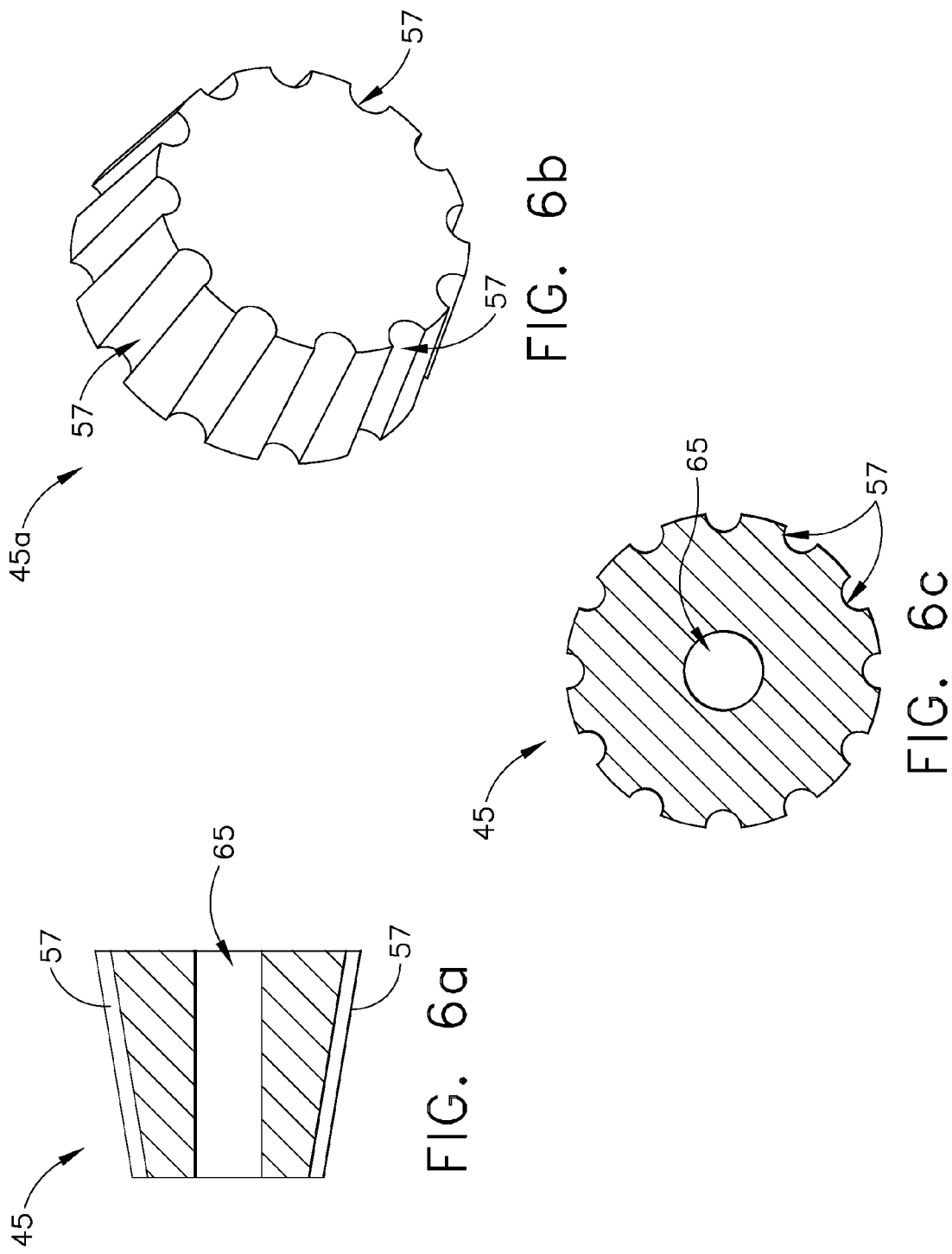

COMPOSITE TIE ROD

BACKGROUND OF THE INVENTION

The present invention generally relates to tie rods and, more particularly, to composite tie rods.

Tie rods have been used extensively in many products such as turbofan engines, air cycle machines, and turbomachinery rotors. Tie rods have been used to maintain component axial placements along a rotor, and to keep all components tight for smooth running. Prior art tie rods are single piece metal rods. Composite tie rods having increased structural dampening, reduced weight, increased stiffness and increased axial preload- and torque-carrying capacities are a bundle of fiber filaments collectively performing the task of a solid metal tie rod.

A carbon fiber drive shaft has been disclosed in U.S. Pat. No. 4,089,190. The tubular shafts are formed using conventional sheath winding techniques. Carbon fibers are impregnated with a resin binder and wound on a mandrel to produce a lightweight shaft having noise and vibration dampening characteristics. Unfortunately, the integrity of these shafts may not be sufficient for some high load applications.

Another shaft has been disclosed in U.S. Pat. No. 4,838,833. The described composite shaft uses reinforcing ribs to improve resistance to torsional buckling. Although the ribs may reduce torque induced shaft deformation, they may not be adequate for high axial load applications such as tie rods in tension.

A shaft having a metal tie-bar (i.e., tie rod) is described in U.S. Pat. No. 6,398,658. The shaft is formed from dissimilar materials, such as a ceramic and a metal, in coaxial alignment. The material least subject to radial expansion, for example the ceramic, is provided with an integral coaxial male member. The material more subject to radial expansion, for example the metal, is provided with an integral female skirt member and annular upstands. The female skirt member is fitted over the male member and the annular upstands are used to maintain the coaxial alignment of the ceramic and metal parts. Annular upstands at the peripheral edge are held in place by the compressive force of a tie-bar. Unfortunately, the described shaft is a rotating shaft for automotive use and has a tight radial clearance requirement along the shaft length. Although some properties of the '658 shaft may benefit from the use of a ceramic member, the brittle ceramic may not be suitable for other applications.

Rotors comprising a metal tie rod have been described. A metal rotor assembly 33 is shown in FIG. 1. The metal rotor assembly 33 has been used in high speed rotating apparatus. The purpose of the metal tie rod 30 is to hold every component 34 along the complete rotor assembly 33 in compression during operation. The metal tie rod 30 is provided with an end nut 31 and a bolt head 32. To achieve the necessary compression, the metal tie rod 30 (with all the components 34 mounted) is stretched to the required length by a hydraulic extensioner or by tightening the end nut 31. The induced compression (transmits from the end nut 31 to the components 34 along the rotor assembly 33) is provided by the metal tie rod 30 in tension. Unfortunately, the metal tie rod 30, which usually comprises steel, has a high thermal coefficient. The metal tie rod 30 experiences thermal growth as operating temperatures increase, which in turn reduces the compressive force along the shaft, rendering it inadequate for some high performance applications, unless a very high tensile preload were used. Further, the additional machining of complex changing diameters along steel tie rods' lengths increase operating costs, and weights.

As can be seen, there is a need for improved tie rods. A tie rod having a low thermal coefficient, reduced weight, and increased strength is needed.

SUMMARY OF THE INVENTION

In one aspect of the present invention, a composite tie rod assembly capable of holding at least one component comprises a composite tie rod comprising at least two fiber bundles; at least two fiber holders in contact with the composite tie rod; and a nut assembly in contact with at least one of the fiber holders such that the composite tie rod assembly is capable of providing a compressive force to the at least one component.

In another aspect of the present invention, an apparatus comprises a first nut assembly; a second nut assembly; and a composite tie rod stretched between and held in tension by the first nut assembly and the second nut assembly, the composite tie rod comprising a plurality of fiber bundles.

In still another aspect of the present invention, an assembly comprises a nut outer body having a tapered inner diameter; a nut center core having a tapered outer diameter positioned radially inward from the nut outer body; and at least one fiber holder radially outward from the nut center core and in contact with the nut outer body.

In yet another aspect of the present invention, a tie rod assembly for a turbomachinery rotor comprises a plurality of fiber bundles positioned parallel to and spaced apart from one another, the fiber bundles capable of providing a compressive force to at least one component of the turbomachinery rotor.

In another aspect of the present invention, a tie rod assembly for holding a plurality of components comprises a plurality of coated fiber bundles, each of the coated fiber bundles having a first end and a second end, the plurality of coated fiber bundles positioned to form a tie rod suitable for installation of the components; a plurality of first fiber holders positioned such that one of the first fiber holders is in contact with each one of the first ends; a plurality of second fiber holders positioned such that one of the second fiber holders is in contact with each one of the second ends; a first nut assembly comprising a nut center core having a tapered outer diameter in contact with each of the first fiber holders and a nut outer body having a tapered inner diameter in contact with each of the first fiber holders, the first nut assembly capable of holding each of the first fiber holders; and a second nut assembly comprising a nut center core having a tapered outer diameter in contact with each of the second fiber holders and a nut outer body having a tapered inner diameter in contact with each of the second fiber holders, the second nut assembly capable of holding each of the second fiber holders such that the tie rod assembly provides a compressive force to the components.

In a further aspect of the present invention, a method of providing a compressive force to a component comprises the steps of inserting a first end of a fiber bundle into a first fiber holder to form a composite tie rod and a bundle tail; positioning the component along the length of the composite tie rod; inserting a second end of the fiber bundle into a second fiber holder to produce a second bundle tail; stretching the fiber bundle; and pushing the first fiber holder into a first nut assembly and pushing the second fiber holder into a second nut assembly.

These and other features, aspects and advantages of the present invention will become better understood with reference to the following drawings, description and claims.

BRIEF DESCRIPTION OF THE DRAWINGS

FIG. 2b is a cross-sectional view when viewed along line II—II of FIG. 2a;

FIG. 6a is a cross-sectional view of a nut center core according to the present invention;

FIG. 6b is a perspective view of a nut center core according to the present invention;

FIG. 6c is a cross-sectional view of a nut center core according to the present invention;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides composite tie rods and methods for producing the same. The tie rods produced according to the present invention may find beneficial use in many industries including aerospace, automotive, and power generation. The composite tie rods of the present invention may be beneficial in applications including turbofan engines, air cycle machines and turbomachinery rotors. The present invention may be useful in any tie rod application.

In one embodiment, the present invention provides a composite tie rod assembly. The composite tie rod assembly may comprise a composite tie rod stretched between two nut assemblies. Unlike the prior art, the composite tie rod may comprise a plurality of parallel spaced apart fiber bundles. The fiber bundles may comprise composite fibers, such as epoxy coated graphite fibers. Unlike the metal tie rods of the prior art, the composite tie rods of the present invention may have a very low thermal coefficient and low density. Also unlike the prior art, the composite tie rods of the present invention may be tailored to have natural frequencies away from rotor critical speeds. The predetermined preload may be almost insensitive to differential thermal growth of the rotor.

Figure 1:
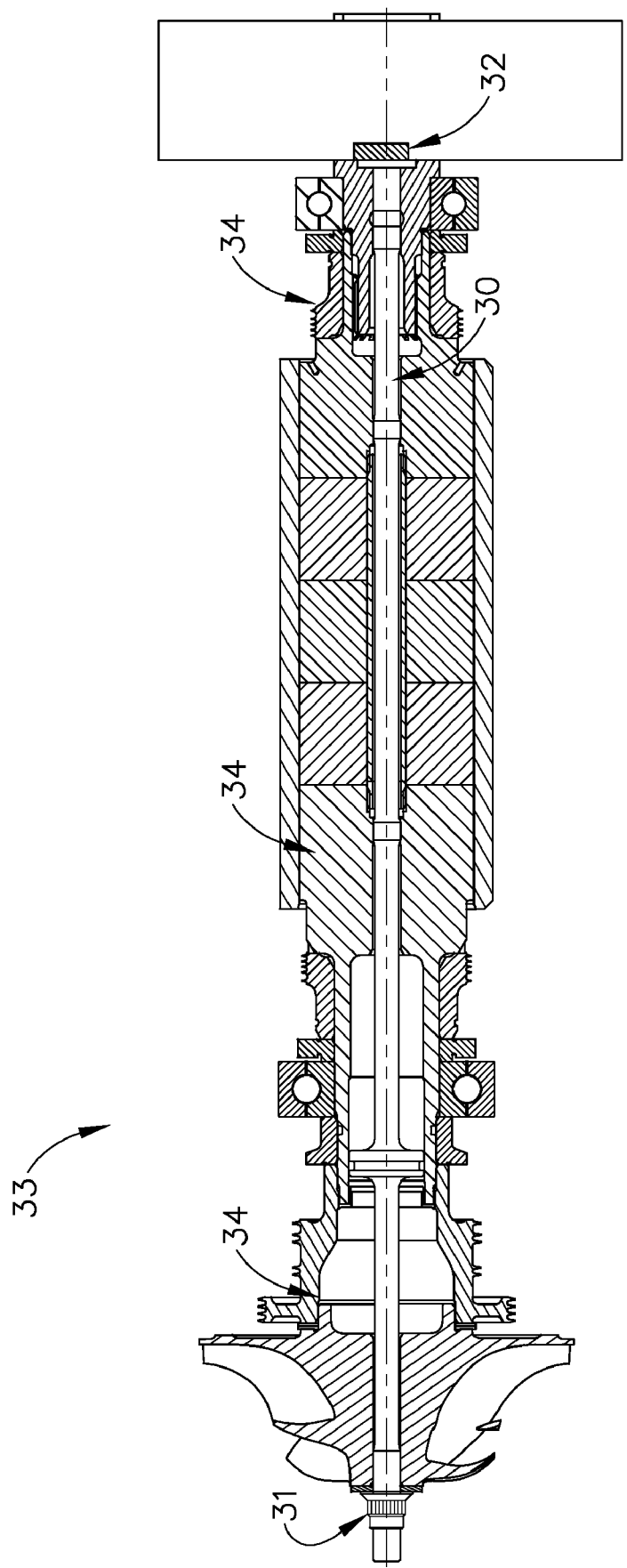
FIG. 1 is a cross-sectional view of a metal rotor assembly with a prior art metal tie rod.
Figure 2A:
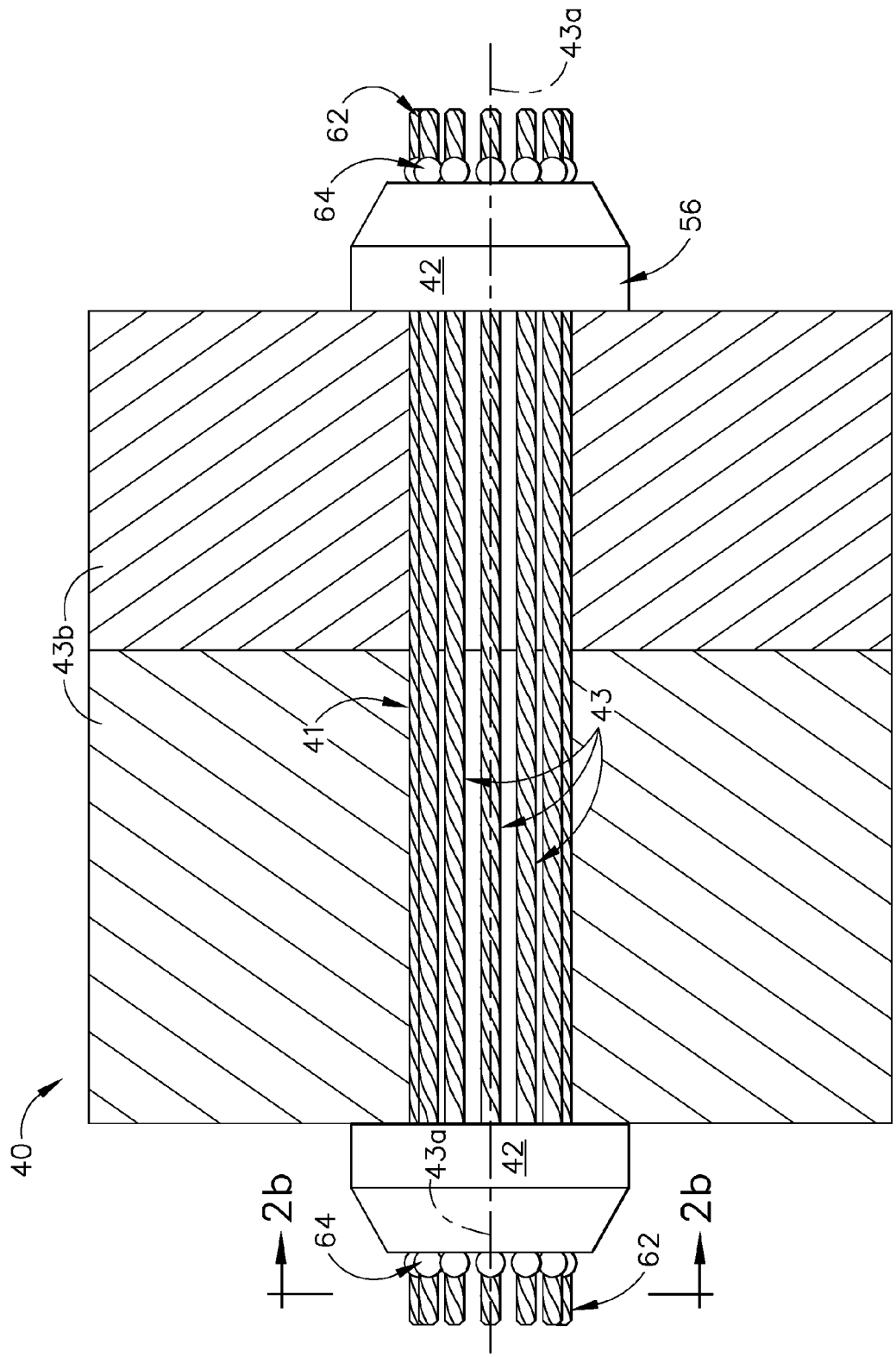
FIG. 2a is a plan view of a composite tie rod according to the present invention.
Figure 2B:
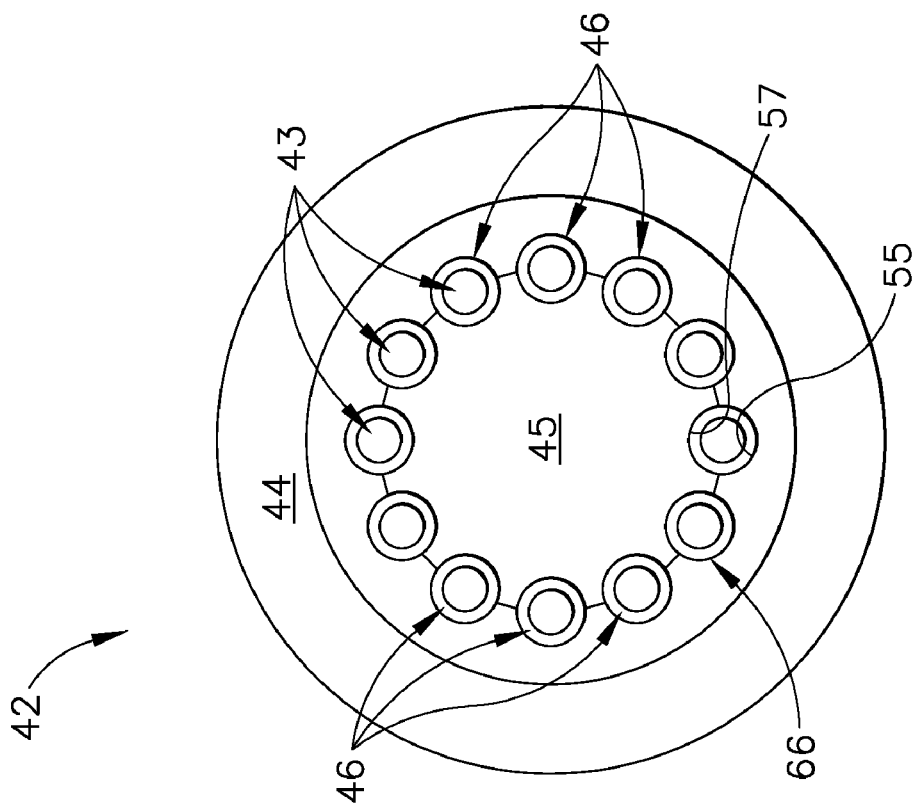

A composite tie rod assembly 40 according to an embodiment of the present invention is shown in FIG. 2a. The composite tie rod assembly 40 may comprise a composite tie rod 41 and two nut assemblies 42. The composite tie rod 41 may comprise a plurality of fiber bundles 43. Each nut assembly 42, as better seen in FIG. 2b, may comprise a nut outer body 44 and a nut center core 45. The nut assembly 42 may have a plurality of nut assembly holes 66 to receive a plurality of fiber holders 46. One fiber bundle 43 may be positioned within each fiber holder 46. During composite tie rod assembly 40 installation, components 43b (FIG. 2a), such as turbine engine components may be positioned along the length of the composite tie rod 41 and the fiber bundles 43 may be stretched. The fiber bundle 43 may be held within the fiber holder 46 by knotting the bundle tail 62 or by providing a resin bead 64 to the bundle tail 62. The fiber holders 46 may be tapered to prevent the fibers holders 46 from being pulled through and out of the nut assembly holes 66 by the tensile force of the stretched fiber bundles 43.

Figure 3:
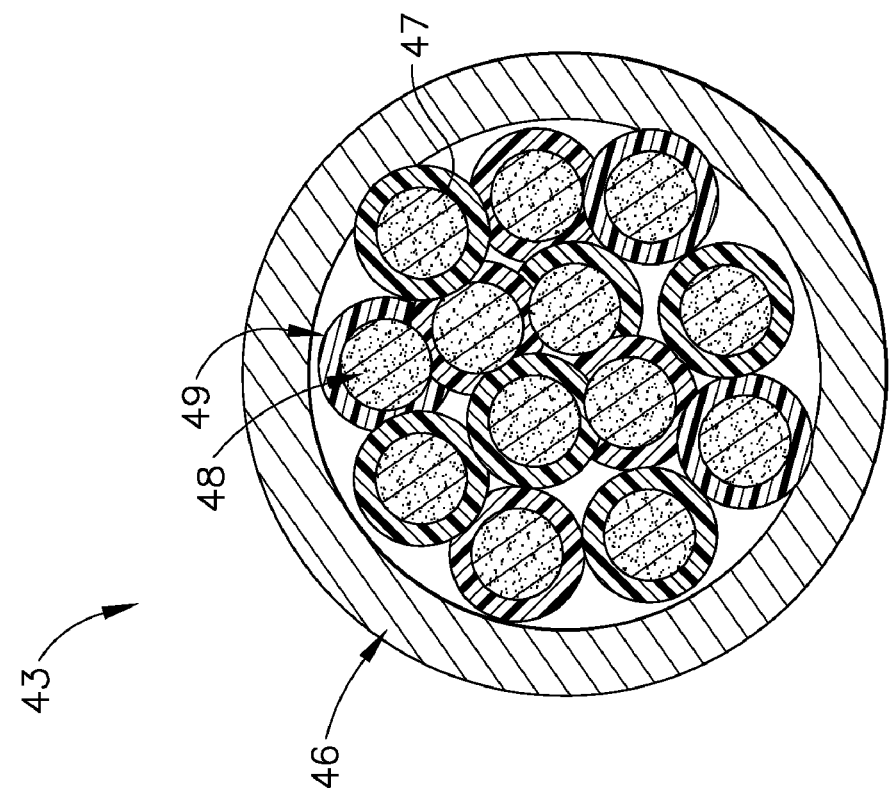
FIG. 3 is a cross-sectional view of a fiber bundle and a fiber holder according to the present invention.

The diameter of a useful fiber bundle 43 may vary with application. For example, thirteen fiber bundles 43, each having a diameter of about 0.0601 inch, may be useful in a turbomachinery rotor application that requires 7300 lbs. preload. For some applications, the diameter of a useful fiber bundle 43 may be between about 0.0439 inch and about 0.1667 inch. Each fiber bundle 43 may comprise at least one composite fiber 47, as shown in FIG. 3. Useful fiber bundles 43 may comprise between about thirty-nine (39) and about five-hundred-sixty-six (566) composite fibers 47. The composite fibers 47 may be positioned parallel to one another within the fiber bundle 43. For some applications, the composite fibers 47 within a fiber bundle 43 may be positioned such that they form a yarn. Although, the parallel arrangement may provide greater axial strength, the yarn arrangement may be less prone to delamination.

The composite tie rod 41 may comprise at least two fiber bundles 43. For some applications, useful composite tie rods 41 may have a diameter between about 0.25 inch and about 0.50 inch. The composite tie rod 41 may comprise a plurality of fiber bundles 43 parallel to and spaced apart from one another. Useful composite tie rods 41 may comprise between about seven and about nineteen fiber bundles 43. The useful number of fiber bundles 43 may vary with composite tie rod diameter and may depend on the size of the preload.

The diameter of a useful fiber bundle 43 may vary with application. For example, thirteen fiber bundles 43, each having a diameter of about 0.0601 inch, may be useful in a turbomachinery rotor application that requires 7300 lbs. preload. For some applications, the diameter of a useful fiber bundle 43 may be between about 0.0439 inch and about 0.1667 inch. Each fiber bundle 43 may comprise at least one composite fiber 47, as shown in FIG. 3. Useful fiber bundles 47 may comprise between about thirty-nine (39) and about five-hundred-sixty-six (566) composite fibers 47. The composite fibers 47 may be positioned parallel to one another within the fiber bundle 43. For some applications, the composite fibers 47 within a fiber bundle 43 may be positioned such that they form a yarn. Although, the parallel arrangement may provide greater axial strength, the yarn arrangement may be less prone to delamination.

The composite fiber 47 may comprise a fiber core 48 and a fiber coating 49. The fiber core 48 may comprise materials including graphite, glass, aramid and others. The fiber coating 49 may comprise a polymer, such as a thermosetting resin. The fiber coating 49 may provide adhesion between adjacent composite fibers 47. Useful composite fibers 47 may include commercially available coated fibers such as epoxy coated carbon fibers available from Hercules, Du Pont, Mitsubishi, BASF, etc. The diameter and composition of a useful composite fiber 47 may vary with application. For example, for a turbofan engine application a useful composite fiber 47 may have a diameter of about 0.007 inch and may comprise a graphite core with an epoxy coating. For some applications, the diameter of a useful composite fiber 47 may be between about 0.005 inch and about 0.009 inch. The diameter of a useful composite fiber 47 may vary with application.

Figure 4B:
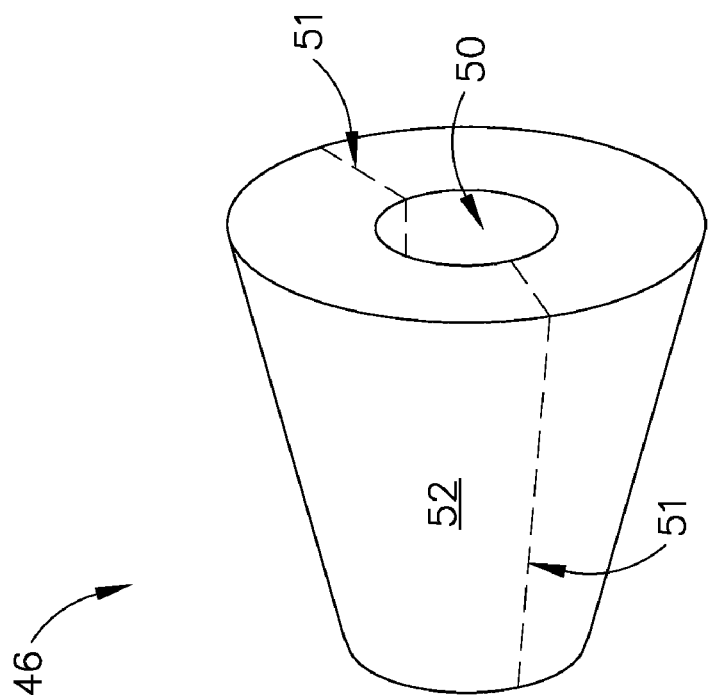
FIG. 4b is a perspective view of a fiber holder according to the present invention.
Figure 4A:
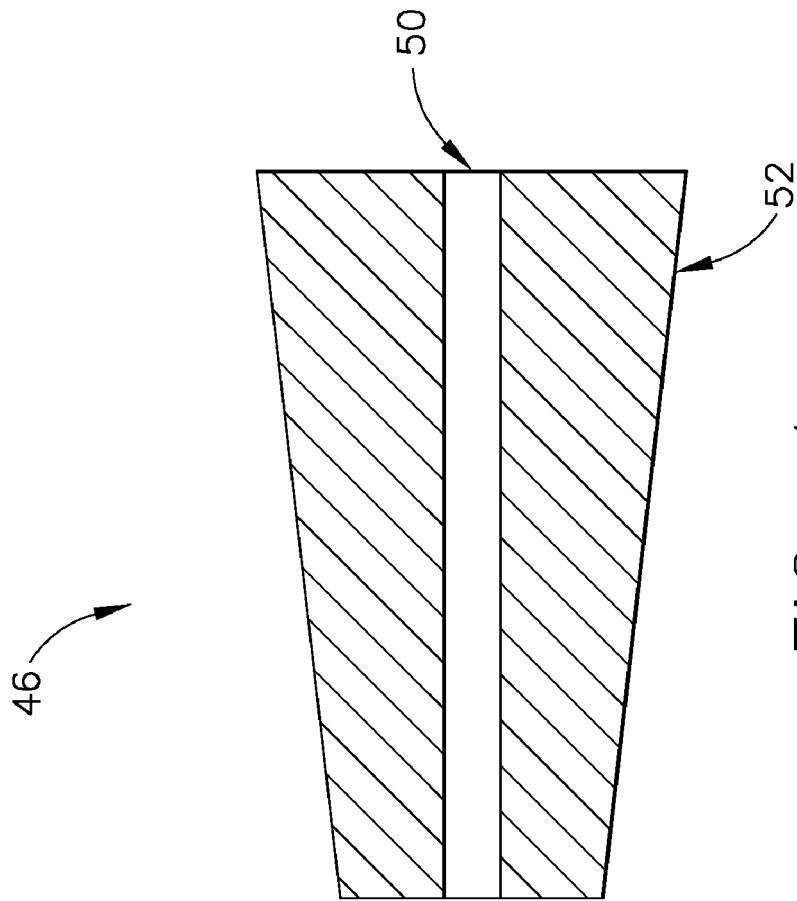
FIG. 4a is a cross-sectional view of a fiber holder according to the present invention.

The fiber holders 46 may hold the fiber bundles 43 in tension. The fiber holder 46, as shown in FIGS. 4*a* and 4*b*, may comprise a tapered cylindrical member 52 having a central opening 50. The fiber holder 46 may be formed by conventional machining techniques. The fiber holder 46 may be cast as one or more pieces. The tapered cylindrical member 52 of fiber holder 46 may have one or more longitudinal slits 51. The longitudinal slit 51 may be useful during composite tie rod assembly manufacturing and/or installation. The fiber holder 46 may comprise a metal such as steel. The central opening 50 may be capable of receiving a portion of a fiber bundle 43. The fiber holder 46 may be positioned within a nut assembly hole 66. The conical shape of the fiber holder 46 may cause the fiber bundles 43 to be compressed when the composite tie rod assembly 40 is installed. This compression may be due to force vector addition when the fiber bundles 43 are stretched. The fiber holder 46 may be positioned in contact with a nut outer body 44 and a nut center core 45.

Figure 5B:
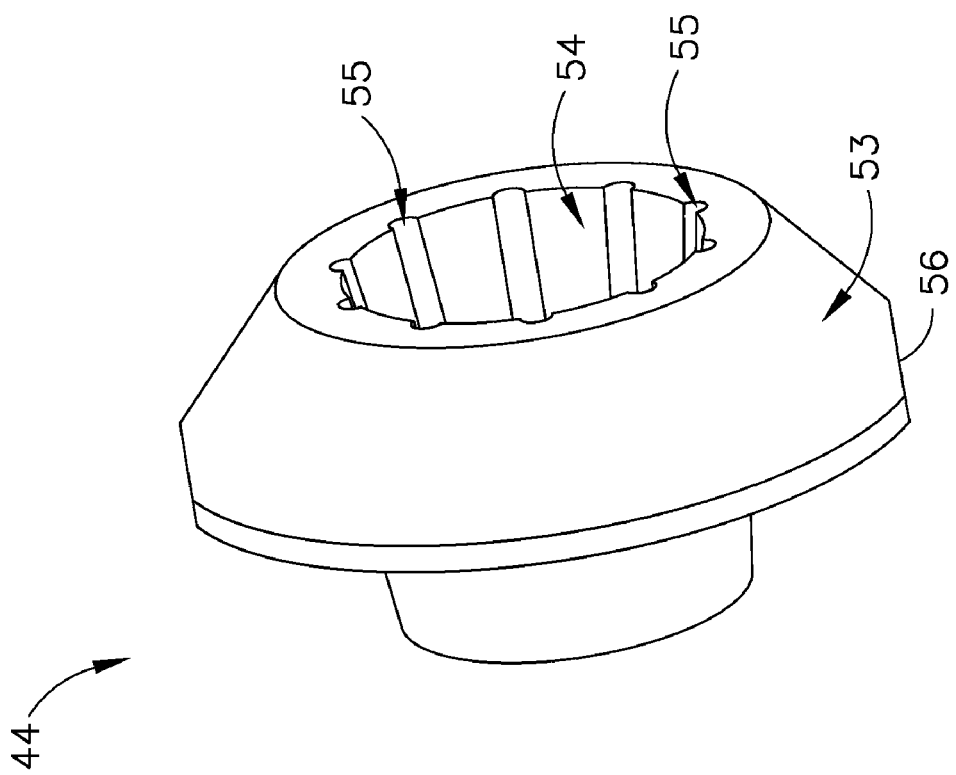
FIG. 5b is a perspective view of a nut outer body according to the present invention.
Figure 5A:
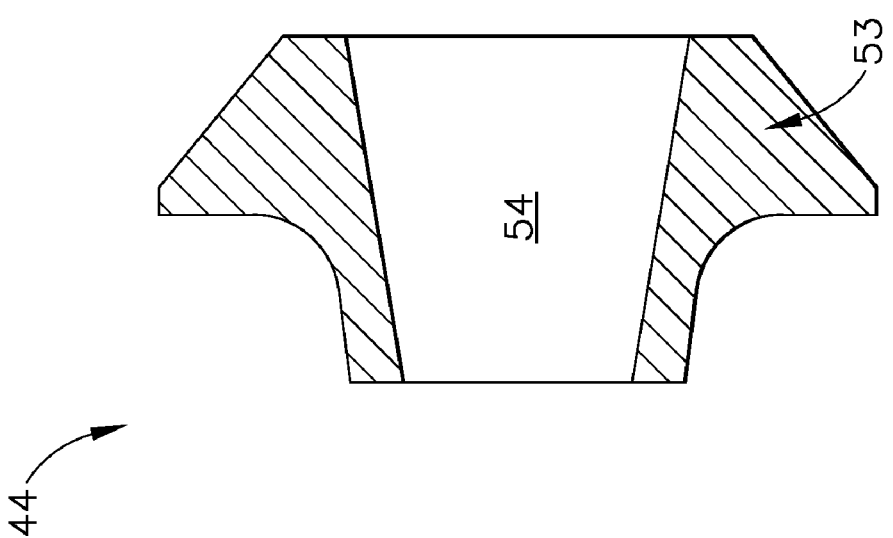
FIG. 5a is a cross-sectional view of a nut outer body according to the present invention.

The nut outer body 44, as shown in FIGS. 5*a* and 5*b*, may comprise a metallic nut 53 having a nut opening 54. The nut outer body 44 may be formed by conventional machining techniques and may comprise a metal, such as steel. The outer diameter of the nut outer body 44 may comprise wrench flats 56, as seen in FIG. 2*a*. The wrench flats 56 may be used during manual turning of the nut outer body 44 to supply axial force for nut assembly installation. The inner diameter of the metallic nut 53 may comprise a plurality of nut grooves 55. Nut groove 55 may be a longitudinal groove capable of receiving a portion of a fiber holder 46. The nut opening 54 may be tapered and may be capable of receiving a nut center core 45.

The nut center core 45, as shown in FIGS. 6*a*, 6*b* and 6*c*, may be formed by conventional machining techniques and may comprise a metal. The nut center core 45 may be tapered such that the nut center core 45 may fit within the nut opening 54. The nut center core 45 may have a core opening 65, as in FIGS. 6*a* and 6*c* or it may be a solid nut center core 45*a* as shown in FIG. 6*b*. The core opening 65 may be useful during assembly and disassembly of the composite tie rod assembly 40. The outer diameter of the nut center core 45 may comprise a plurality of core grooves 57. Core groove 57 may be a longitudinal groove capable of receiving a portion of a fiber holder 46. The number of core grooves 57 may equal the number of nut grooves 55. A core groove 57 in combination with a nut groove 55 may define a nut assembly hole 66. Each core groove/nut groove pair (nut assembly hole 66) may be designed to form an interference fit with a fiber holder 46.

Figure 7:
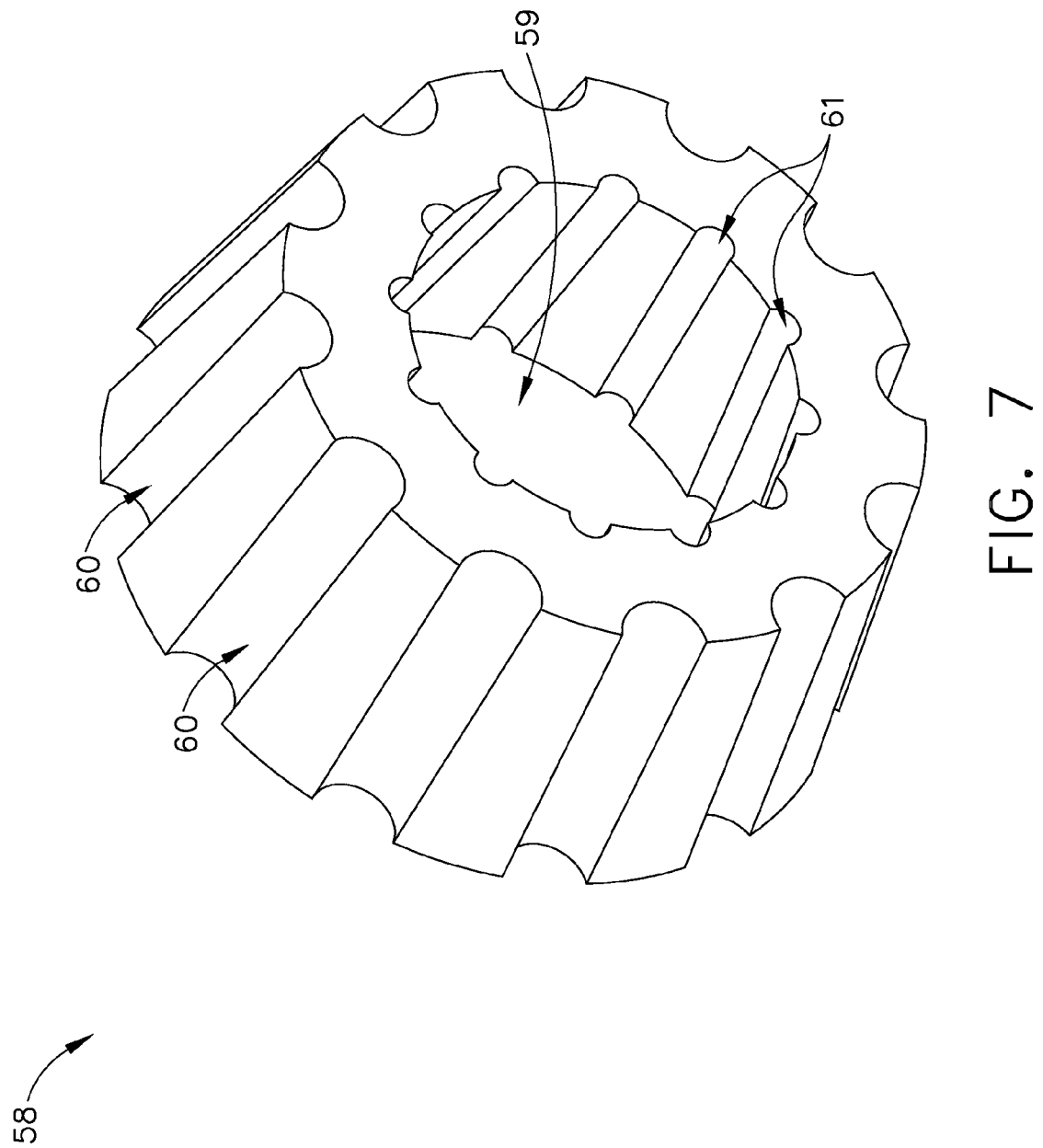
FIG. 7 is a perspective view of a nut annular member according to the present invention.
Figure 7B:
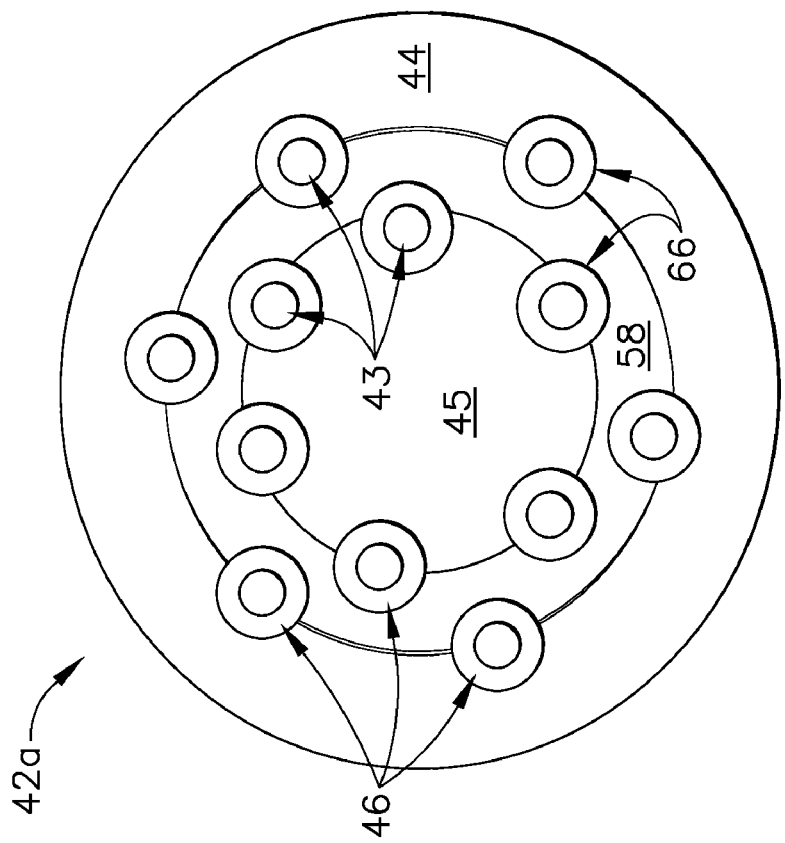
FIG. 7b is a cross-sectional view of a nut assembly in accordance with the present invention.
Figure 7A:
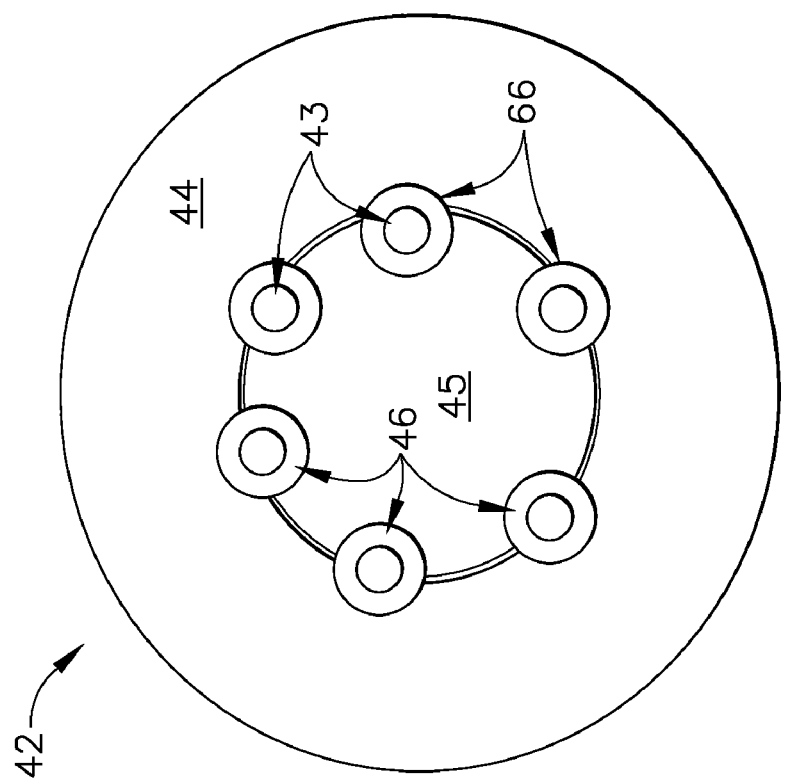
FIG. 7a is a cross-sectional view of a nut assembly in accordance with the present invention.

In an alternate embodiment of the present invention, the nut center core 45 may be designed to fit within a nut annular member 58. The nut annular member 58, as shown in FIG. 7, may be formed by conventional machining techniques and may comprise a metal such as steel. The nut annular member 58 may be tapered such that the nut annular member 58 may fit within the nut opening 54. The nut annular member 58 may comprise a member opening 59. The member opening 59 may be designed such that the nut center core 45 may fit within the member opening 59. As shown in FIG. 7*b*, the outer diameter of the nut annular member 58 may comprise a plurality of member outer grooves 60. The inner diameter of the nut annular member 58 may comprise a plurality of member inner grooves 61. The member outer groove 60 and the member inner groove 61 each may be a longitudinal groove capable of receiving a portion of a fiber holder 46. The number of member outer grooves 60 may equal the number of nut grooves 55. A member outer groove 60 in combination with a nut groove 55 may define a nut assembly hole 66 as shown in FIGS. 7*a* and 7*b*. Each member outer groove/nut groove pair (nut assembly hole 66) may be designed to form an interference fit with a fiber holder 46. The number of member inner grooves 61 may equal the number of core grooves 57. A member inner groove 61 in combination with a core groove 57 may define a nut assembly hole 66. Each member inner groove/core groove pair (nut assembly hole 66) may be designed to form an interference fit with a fiber holder 46. A nut assembly 42 comprising a nut annular member 58 may allow the number of fiber bundles 43 to be increased without also increasing the diameter of the composite tie rod 41.

The composite tie rod assembly 40 may be used to maintain the position of a plurality of components during operation. For example, the composite tie rod assembly 40 may be installed in a turbomachinery rotor to hold the rotating components together. The composite tie rod assembly 40 may be capable of providing a compressive force. The composite tie rod assembly 40 may comprise at least one nut assembly 42. A composite tie rod 41 may be held in tension by a first nut assembly 42 positioned at one end of the composite tie rod 41 and a second nut assembly 42 positioned at the other end of the composite tie rod 41. A composite tie rod assembly 40 having two nut assemblies 42 may allow for greater tension adjusting flexibility.

Figure 8:
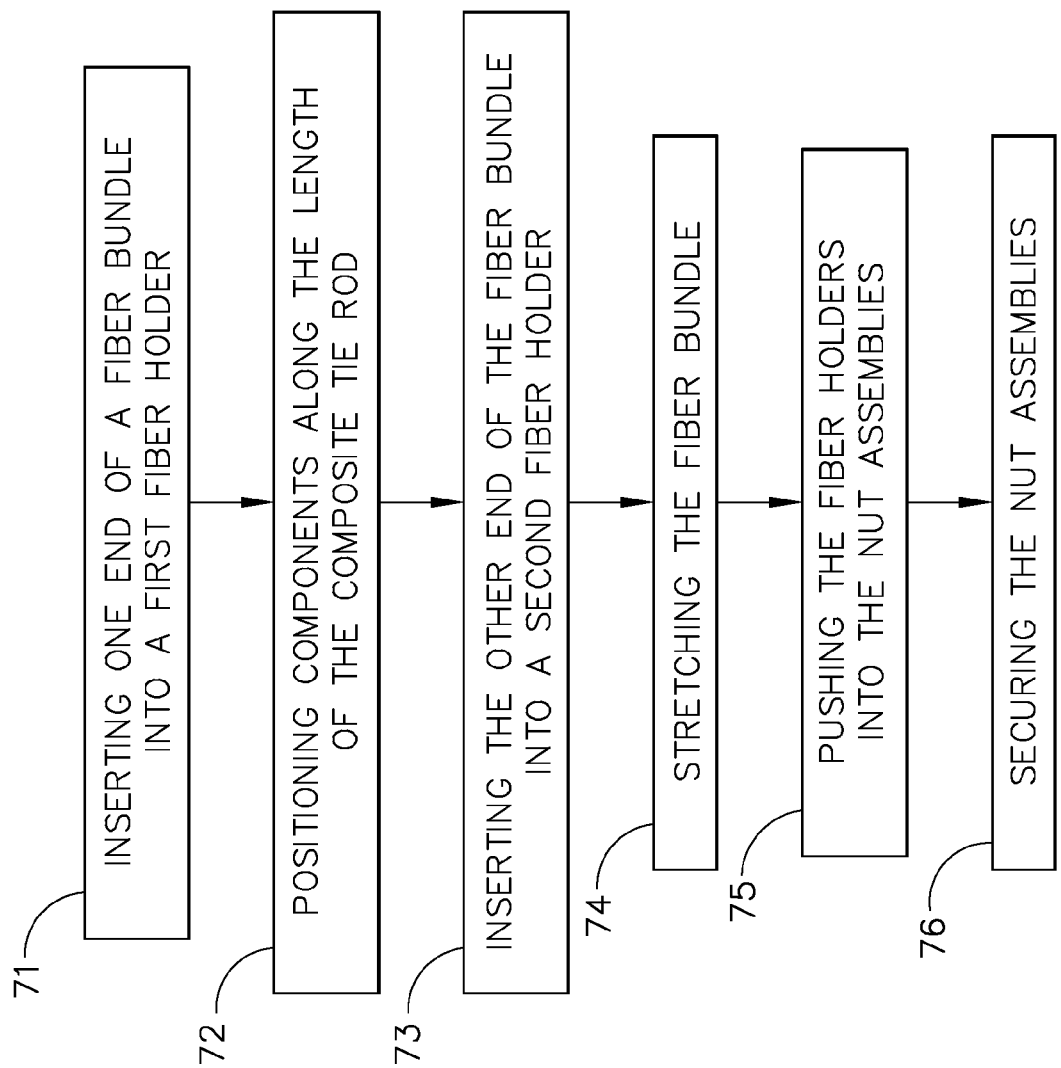
FIG. 8 is a flow chart depicting a method of providing a compressive force according to the present invention.

A method 70 of providing a compressive force to at least one component is shown in FIG. 8. The method 70 may comprise a step 71 of inserting one end of a fiber bundle into a first fiber holder, a step 72 of positioning the component(s) along the length of the composite tie rod, a step 73 of inserting the other end of the fiber bundle into a second fiber holder, a step 74 of stretching the fiber bundle, and a step 75 of pushing the fiber holders into the nut assemblies. The method 70 may further comprise a step 76 of securing the nut assemblies.

The step 71 of inserting one end of a fiber bundle 43 into a first fiber holder 46 may comprise threading the fiber bundle 43 through the central opening 50 such that a bundle tail 62 is produced. A bundle tail 62, shown in FIG. 2*a*, may be the portion of the fiber bundle 43 that extends from the outward end 63 of the fiber holder 46. The outward end 63 may be the end of the fiber holder 46 having the larger diameter, as shown in FIGS. 4*a* and 4*b*. The fiber holder 46 may be in contact with the nut assembly 42. The fiber holder 46 may be in contact with, for example a nut groove 55 and a member outer groove 60. The fiber holder 46 may be positioned in contact with the nut assembly 42 before the step 71 of inserting the fiber bundle 43. A step 71 may be performed for each fiber bundle 43 of the composite tie rod 41.

The step 72 of positioning the component(s) along the length of the composite tie rod may comprise installing the components. The components may vary with application.

The step 73 of inserting the other end of the fiber bundle 43 into a second fiber holder 46 may comprise threading the other end of the fiber bundle 43 through the central opening 50 of a second fiber holder 46 such that a second bundle tail 62 is produced. The second fiber holder 46 may be in contact with a second nut assembly 42.

The step 74 of stretching the fiber bundle 43 may comprise stretching the fiber bundle 43 such that the fiber bundle 43 is under tension and is capable of providing a compressive force. The step 74 of stretching the fiber bundle 43 may vary with the composition of the composite fiber 47. Useful techniques for stretching the fiber bundle 43 may be described by the manufacturer of the composite fiber 47. The described techniques may include using a series of wheels to stretch the fibers. The conical shape of the fiber holder 46 may cause the fiber bundle 43 to be compressed such that the fiber holder 46 grips the fiber bundle 43. This may be due to force vector addition.

The step 75 of pushing the fiber holders into the nut assemblies may comprise pushing the fiber holders 46 such that the fiber bundle 43 is held by interference. The fiber holder 46, nut assembly 42 and fiber bundle 43 may be designed to provide an appropriate interference fit between the fiber holder 46 and the nut assembly 42. The interference fit may be such that the holding force developed is capable of maintaining the fiber bundle 43 in a stretched position. The conical shape of the nut center core 45 may cause the fiber holders 46 to be compressed such that the nut assembly 42 grips the fiber holders 46, retaining the fiber holders 46 within the nut assembly holes 66 and maintaining the fiber bundles 43 in a stretched position. This may be due to force vector addition.

The step 76 of securing the nut assembly 42 may comprise locally curing the nut assembly 42. The step 76 of securing the nut assembly 42 may comprise knotting the bundle tail 62. The step 76 of securing the nut assembly 42 may comprise providing a clip (not shown) to the bundle tail 62. The step 76 of securing the nut assembly 42 may comprise providing a resin bead 64 (shown in FIG. 2a) to the bundle tail 62 and curing the resin bead 64. Any known means of securing the nut assembly 42 may be useful with the present invention.

As can be appreciated by those skilled in the art, the present invention provides improved tie rod assemblies and methods for their production. A low density, lightweight composite tie rod is provided. Also provided is a composite tie rod assembly having a very low thermal coefficient. Further, a tie rod nut assembly requiring no shrink-fit is provided.

It should be understood, of course, that the foregoing relates to exemplary embodiments of the invention and that modifications may be made without departing from the spirit and scope of the invention as set forth in the following claims.

We claim:

1. A composite tie rod assembly capable of holding rotatable components of a turbomachine comprising:
    a composite tie rod comprising at least two non-metallic fiber bundles;
    at least two fiber holders in contact with the at least two non-metallic fiber bundles; and
    nut assemblies in contact with said fiber holders such that said composite tie rod assembly is capable of providing compressive forces to said components.

2. The composite tie rod assembly of claim 1, wherein at least one of said nut assemblies comprises a nut outer body and a nut center core in contact with said nut outer body.

3. The composite tie rod assembly of claim 1, wherein at least one of said nut assemblies comprises a nut outer body, a nut annular member radially inward from and in contact with said nut outer body, and a nut center core radially inward from and in contact with said nut annular member.

4. The composite tie rod assembly of claim 1, wherein each of said fiber bundles has a diameter between about 0.0439 inch and about 0.1667 inch.

5. The composite tie rod assembly of claim 1, wherein said composite tie rod comprises between about 7 to about 19 of the non-metallic fiber bundles.

6. The composite tie rod assembly of claim 1, wherein at least one of said nut assemblies comprises a tapered nut center core, a tapered nut annular member radially outward from said tapered nut center core and a nut outer body radially outward from said tapered nut annular member.

7. The composite tie rod assembly of claim 1, wherein each of said fiber bundles comprises a plurality of epoxy coated carbon fibers.

8. The composite tie rod assembly of claim 1, wherein each of said fiber bundles comprises about 39 or more fibers.

9. An apparatus for producing compressive forces between adjacent rotatable components of a turbomachine comprising:
    a first nut assembly;
    a second nut assembly;
    a composite tie rod stretched between and held in tension by said first nut assembly and said second nut assembly in contact with the rotatable components; and
    wherein said composite tie rod comprises a plurality of non-metallic fiber bundles.

10. The apparatus of claim 9, wherein at least one said nut assembly has wrench flats.

11. The apparatus of claim 9, wherein said composite tie rod has a diameter between about 0.25 inch to about 0.50 inch.

12. The apparatus of claim 9, wherein said composite tie rod comprises a plurality of polymer coated aramid fibers.

13. The apparatus of claim 9, wherein said composite tie rod comprises a plurality of epoxy coated graphite fibers.

14. The apparatus of claim 9, wherein each of said fiber bundles is a yarn.

15. A turbomachinery rotor assembly comprising:
    at least two rotatable components adapted for rotation about an axis;
    a plurality of non-metallic fiber bundles positioned parallel to the axis; and
    said plurality of fiber bundles providing a compressive force between the rotatable components of said turbomachinery rotor assembly.

16. The turbomachinery rotor assembly of claim 15, wherein each said fiber bundle comprises a plurality of composite fibers.

17. The turbomachinery rotor assembly of claim 16, wherein each said composite fiber comprises a fiber core and a fiber coating.

18. The turbomachinery rotor assembly of claim 17, wherein said fiber core comprises a material selected from the group consisting of graphite, glass and aramid.

19. The turbomachinery rotor assembly of claim 17, wherein said fiber coating comprises a thermosetting resin.

20. A tie rod assembly for producing compressive force between a plurality of rotatable components in a turbomachine comprising:
    a plurality of coated non-metallic fiber bundles, each of said coated fiber bundles having a first end and a second end, said plurality of coated fiber bundles positioned to form a tie rod suitable for installation through said components;

a plurality of first fiber holders positioned such that one of said first fiber holders is in contact with each one of said first ends;

a plurality of second fiber holders positioned such that one of said second fiber holders is in contact with each one of said second ends;

a first nut assembly comprising a nut center core having a tapered outer diameter in contact with each of said first fiber holders and a nut outer body having a tapered inner diameter in contact with each of said first fiber holders, said first nut assembly capable of holding each of said first fiber holders; and a second nut assembly comprising a nut center core having a tapered outer diameter in contact with each of said second fiber holders and a nut outer body having a tapered inner diameter in contact with each of said second fiber holders, said second nut assembly capable of holding each of said second fiber holders such that said tie rod assembly provides a compressive force to said components.

* * * * *